US011103966B2

(12) United States Patent
Hohmann et al.

(10) Patent No.: US 11,103,966 B2
(45) Date of Patent: Aug. 31, 2021

(54) METHOD FOR TIGHTENING SCREW CONNECTIONS

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 27 days.

(21) Appl. No.: 16/705,462

(22) Filed: Dec. 6, 2019

(65) Prior Publication Data
US 2020/0180086 A1   Jun. 11, 2020

(30) Foreign Application Priority Data
Dec. 7, 2018  (DE) ...................... 10 2018 131 305.5

(51) Int. Cl.
*B23P 19/06*   (2006.01)

(52) U.S. Cl.
CPC ................... *B23P 19/067* (2013.01)

(58) Field of Classification Search
CPC .... B23P 19/067; Y02P 70/50; F05B 2230/60; F05B 2260/301; F03D 13/10; B25B 29/02
See application file for complete search history.

(56) References Cited

U.S. PATENT DOCUMENTS

| 5,257,207 | A  | * | 10/1993 | Warren | ................... | B25B 29/02 |
| | | | | | | 702/43 |
| 8,261,421 | B2 | * | 9/2012 | Monville | ................ | B25B 29/02 |
| | | | | | | 29/446 |
| 9,212,651 | B2 | * | 12/2015 | Johst | ...................... | B25J 9/1633 |
| 10,450,053 | B2 | * | 10/2019 | Doyle | .................... | G01B 11/14 |
| 2010/0005663 | A1 | * | 1/2010 | Monville | ............. | B23P 19/067 |
| | | | | | | 29/898.09 |
| 2014/0350724 | A1 | * | 11/2014 | Johst | ...................... | F03D 13/20 |
| | | | | | | 700/253 |
| 2017/0327201 | A1 | * | 11/2017 | Doyle | .................... | G01B 11/14 |

FOREIGN PATENT DOCUMENTS

EP   3 195 991   7/2017

* cited by examiner

*Primary Examiner* — Lawrence Averick
(74) *Attorney, Agent, or Firm* — Gudrun E. Huckett

(57) ABSTRACT

For tightening screw connections disposed along two annular flanges to be tensioned relative to one another and forming a ring, a tool carrier movable along the ring has a tool and a sensor. It is moved along the ring at least once, wherein current longitudinal positions of the tool carrier relative to the ring are repeatedly detected as position values and the gap size between the annular flanges at the respective current position is repeatedly detected as a gap size value by the sensor. These values are transmitted to a control and evaluation unit storing gap size values conjointly with assigned position values as datasets and determining, based on the datasets, the largest or an above-average gap size value together with assigned position value as a primary position. The screw connection at the primary position or a directly adjacent one in circumferential direction is tightened by the tool.

12 Claims, 1 Drawing Sheet

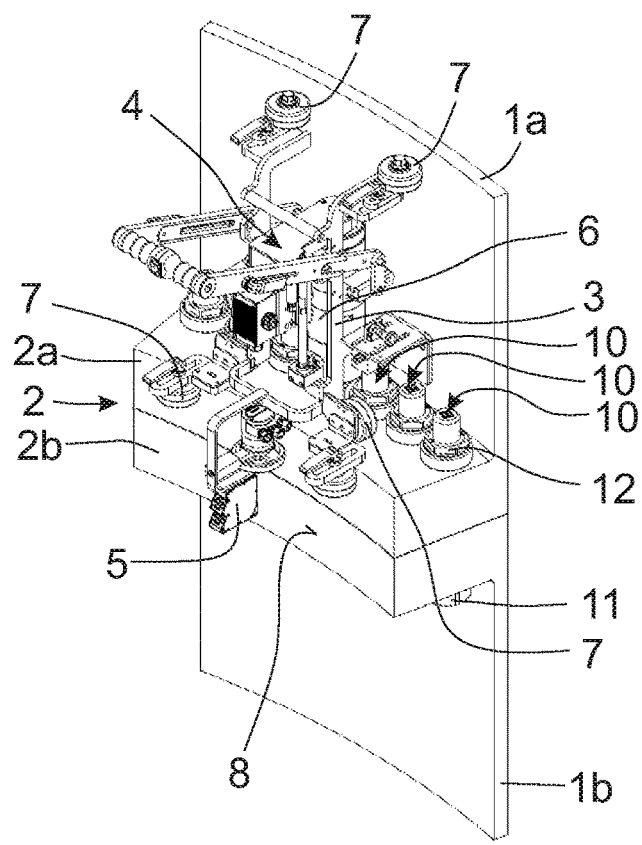
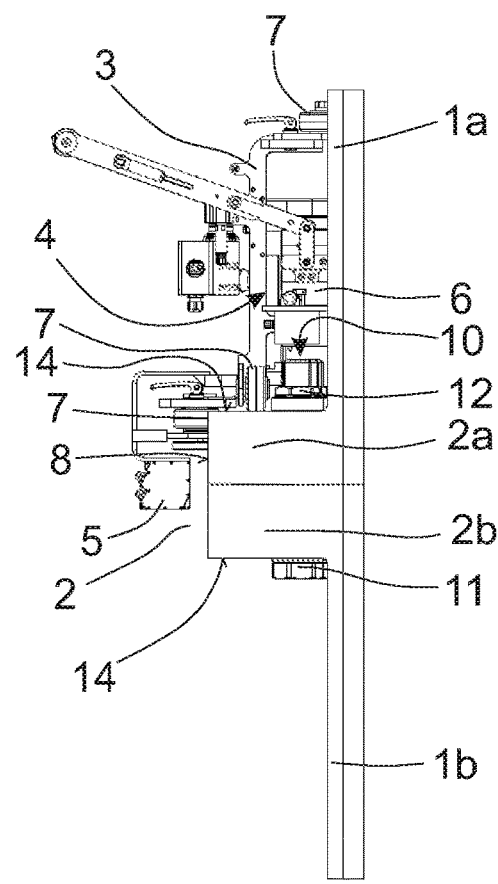
Fig. 1    Fig. 2
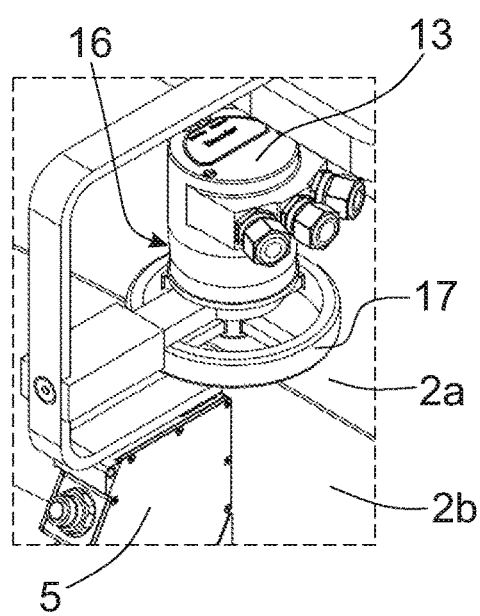
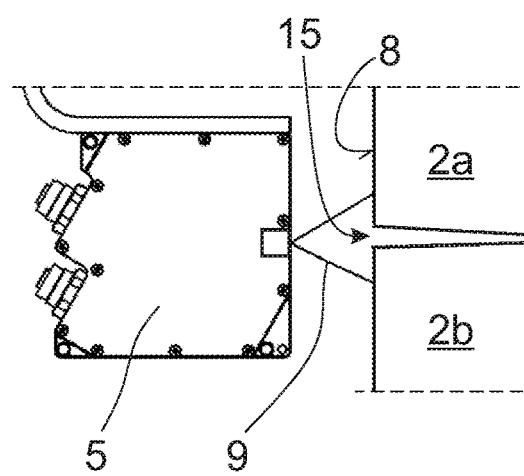
Fig. 3    Fig. 4

METHOD FOR TIGHTENING SCREW CONNECTIONS

BACKGROUND OF THE INVENTION

The invention relates to a method for tightening screw connections which are situated at screw positions that are disposed in a row along two annular flanges that are to be tensioned in relation to one another, wherein each screw connection is comprised of a threaded element and a nut screw-fitted thereon, and the nut is supported in relation to the one of the two annular flanges and the threaded element is supported in relation to the other of the two annular flanges, having a tool carrier which is capable of travelling along the ring that is formed by the annular flanges, the component parts of the tool carrier being at least one tool for tightening the screw connection and a sensor.

Such a device is known from EP 3 195 991 A1. This device serves for successively tightening screw connections that are disposed in a row along a flange. Each individual screw connection is comprised of a threaded element in the form of a threaded bolt which by way of the radially extended bolt head thereof is supported from below in relation to the flange, and of a threaded nut that is screw-fitted on the threaded portion of the threaded bolt, wherein the nut is supported from above on the flange. The tightening, or retightening, respectively, of the screw connection is performed in that the nut is readjusted along the thread. This takes place by using a tool that is disposed on a self-driving vehicle. The vehicle having the tool disposed thereon is driven in a controlled manner by means of a position sensor and the position signals detected by the sensor until it is derived from the sensor signals that the tool is situated precisely in an axial alignment in relation to the screw-fitting axis of the threaded bolt and the threaded nut. To this end, the position signals of the position sensor in terms of control technology are processed so as to form signals for the drive of the vehicle. The control system is moreover configured for controlling the tightening procedure.

In practice, the contact faces of annular flanges such as are typical of the screw-fitting of tower portions of a wind power plant are not configured so as to be precisely mutually parallel. Therefore, the contact faces do not bear on one another in a fully planar manner. Rather, an at least partially encircling gap still remains between the annular flanges before the latter are screw-fitted, the height of the gap in terms of the central axis of the annular flanges increasing in a radially inward manner. By virtue of inter alia production-related tolerances, the gap can have an irregular gap height and thus gap size. In order for the tower portions to be fixedly connected the gap is subsequently closed by means of the screw connections which are disposed on screw positions across the entire circumference of the annular flanges.

The object of the present invention thus lies in proposing an alternative method for tightening screw connections, the alternative method particularly considering that a gap having an irregular height often exists between the two annular flanges in the case of flange connections of this type.

SUMMARY OF THE INVENTION

This object is achieved by a method for tightening screw connections of the aforementioned kind in that the method according to the invention for tightening screw connections lies in that a) the tool carrier is moved along the entire length of the ring at least once, and in that repeatedly
  the respective current longitudinal position of the tool carrier in relation to the ring is herein detected as a position value, and
  the size of the gap present between the two annular flanges at the respective current position is detected as the gap size value by means of the sensor,
  and these are transmitted to a control and evaluation unit which stores the individual gap size values conjointly with the respectively assigned position values as datasets;

b) the control and evaluation unit from the gap size values contained in the datasets determines the largest gap size value or a gap size value of above-average size, and determines the position value assigned to the determined gap size value as a primary position;

c) and the screw connection subsequently tightened by the tool is that screw connection that is situated at the primary position or at a screw position that in a circumferential direction directly follows the primary position.

Preferred or advantageous embodiments of the invention are derived from the dependent claims.

In other words, the actually existing profile of the gap sizes is detected by means of a multiplicity of individual gap size values between the two annular flanges. The gap size value is in particular to be understood as the vertical spacing between the annular flanges at the respective position. The gap size between the annular flanges that typically increases towards the inside is influenced by tolerances in terms of shape, production and/or orientation, and by means of the method according to the invention is closed in a step-by-step manner such that an achievable assembly pretensioning force of the screw connections is increased. Consequently, the annular flange connections as are typical of the screw-fitting of tower portions of a wind power plant come to bear axially on one another and are drawn towards one another by means of the screw connections, the position of the latter being determined on account of the construction and thus being known. The screw connections in the circumferential direction have an at all times consistent mutual spacing, thus circumferential spacing.

The position values can be successively determined for each screw connection, that is to say at each screw position. In other words, the tool carrier is moved from a first screw connection to the screw connection that is disposed so as to be adjacent to the first screw connection, wherein the respective gap size value for the position value is detected at the respective position. This continues until the tool carrier arrives back at the first screw connection.

The tool carrier is preferably embodied so as to be self-driving, wherein the tool carrier in a manner controlled by the control and evaluation unit is moved to each position along the length of the ring. Alternatively, position values conjointly with gap size values can be detected in an arbitrary manner at any position along the entire length of the ring, thus not in the sequence of the screw-fittings or at the locations of the screw-fittings.

The mentioned steps a) to c) are preferably repeated once or multiple times so as to guarantee particularly uniform tightening of the screw connections and to ultimately implement a gap-free connection between the two annular flanges.

After a first tightening of screws at the primary position, or in the region of the primary position, respectively, steps a) to c) can be repeated, wherein new position values and/or other gap size values are determined and stored in datasets of the control and evaluation unit. The largest gap size value or a gap size value of above-average size is in turn determined by means of the newly determined gap size values which have been freshly determined at the multiplicity of positions on the circumference of the ring. The position value assigned to the determined gap size value is determined as the new primary position at which the screw connection is subsequently tightened by the tool. Should there not be any screw connection directly at the newly determined primary position, the screw connection at a screw position that in the circumferential direction is directly ahead of or behind the new primary position is tightened instead according to step c).

These steps can be repeated until the gap is closed, wherein primary positions which can be present at various positions of the annular flanges can be successively determined. A plurality and optionally also different screw connections are thus successively tightened until the gap between the annular flanges is substantially closed. The control and evaluation unit herein can be conceived in such a manner that the control and evaluation unit proposes a next screw position, that is to say a new primary position for tightening the screw connection.

In turn, all of the screw connections that to this point have not yet been tightened are preferably subsequently tightened by the tool. Consequently, the gap between the annular flanges is completely closed, wherein the further screw connections are tightened and/or retightened successively, diagonally, in a star-shaped manner, or in an arbitrary manner.

A laser scanner is furthermore preferably provided as the sensor. The annular flanges as well as the gap lying therebetween are scanned in a grid-type or linear manner by the laser scanner so as to measure the height of the gap and thus to determine the gap size value at the respective screw position. The laser scanner is preferably a two-dimensional laser scanner.

The measuring beam of the laser scanner is preferably aligned in the contact plane between the two annular flanges. In other words, the measuring beam is aligned in such a manner that the measuring beam is directed perpendicularly onto the internal shell face of the ring gaps having the gap lying therebetween, that is to say onto the gap residual, or the annular flange residual, respectively.

According to one preferred embodiment the tool carrier is displaced on a plurality of rollers along the ring formed by the annular flanges. It is thus provided by way of one design embodiment that the tool carrier in order to be supported on the upper side of the flange connection is provided with rollers which are mounted on horizontal rotation axles on the tool carrier. The object of the rollers is above all to support the weight of the tool carrier having the tool disposed thereon.

Additionally, the tool carrier for the lateral support thereof, for instance in relation to the internal wall of the tower of the wind power plant, can be provided with additional rollers which are mounted on substantially vertical rotation axles on the tool carrier. The rotation axles of the rollers are disposed so as to be substantially parallel with the internal wall of the tower.

The rollers, thus those rollers mounted on horizontal rotation axles and those mounted on substantially vertical rotation axles or rotation axles that are parallel with the internal wall of the tower, do not all have to be driven. Rather, a design embodiment in which only some of the rollers, for example only a single roller, are/is driven is preferable. The remaining rollers in this instance are non-driven, idling rollers.

It is advantageous for a roller which supports particularly much of the weight of the tool carrier to be a driven roller. Therefore, it is proposed by way of one design embodiment that each driven roller is one of those rollers which are mounted on horizontal rotation axles.

The position values of the screw positions are preferably detected by means of a distance sensor. The control and evaluation unit, upon determining the primary position, by means of the measured position values is capable of displacing the tool carrier in a controlled manner from the momentary position thereof in relation to the ring to the position value of the primary position until it is derived from the signals of the distance sensor that the tool is situated at the screw position. The screw position is to be understood to be the screw-fitting axis of the respective screw connection to be tightened.

The distance sensor preferably comprises at least one of the rollers and one rotary or angular encoder that detects the respective roller axle. One or a plurality of rollers is/are configured in such a manner that the current longitudinal position of the tool along the ring, or the annular flanges, respectively, can be registered as the position value by way of the roller/rollers.

An angular encoder detects the rotation angle of the respective roller, the precise distance travelled by the roller being able to be calculated from the rotation angle in the control and evaluation unit so as to reach precise values in controlling the approach path to the next screw connection. Controlling of the path is thus designed so as to be precise and verifiable. Furthermore, the rotating speed of the roller, or of the roller axle, respectively, can be determined by means of the rotary or angular encoder.

Since driven rollers often operate by way of a certain slippage, it is advantageous if the rotation-angle encoded roller is not a driven roller but one of the non-driven rollers.

The rotation-angle encoded roller is preferably an additional roller that laterally supports the tool carrier. The advantage of this design embodiment lies in that the internal wall in the case of a tower of a wind power plant are typically relatively smooth such that a roller running on the face indicates particularly precise and reproducible angle values.

Alternatively, the distance sensor comprises a measuring wheel and a rotary encoder or angular encoder that detects the measuring wheel axle. The measuring wheel is preferably positioned against one of the annular flanges. Consequently, the measuring wheel in this case is preferably horizontally aligned and runs along the internal circumferential face of the respective annular flange. The measuring wheel can also be vertically disposed on the tool carrier in such a manner that the measuring wheel rolls on a horizontal contact face of the one or the other annular flange.

The invention includes the technical teaching that the tool carrier for travelling along the ring is provided with an electric travel drive, and the control and evaluation unit by way of travel drive control signals is configured for moving the tool carrier up to a longitudinal position in which the tool lies opposite the screw position of the respective screw connection to be tightened, and by way of tool control signals is configured for carrying out the tightening of the respective screw connection. The control and evaluation unit thus receives the position values and gap size values detected by the sensor and stores the position values and gap size values in an orderly manner, wherein the control and evaluation unit further controls the drive of the tool carrier and the tightening procedure of the respective screw connection.

The control and evaluation unit for moving to the respective longitudinal position of the screw connection to be tightened preferably has a distance control module having a distance controller which is configured for stopping the travel drive upon reaching a predefined length of the distance as the target variable. The distance controller implemented as a module of the control unit is configured for stopping the travel drive upon reaching a distance variable as the nominal value, or target value, respectively, predefined in the control unit, and to thus interrupt the travel of the tool carrier. The tool carrier having the tool disposed thereon is driven by means of the travel drive in a controlled manner until it is derived from the signals of the distance sensor that the tool is situated at that screw position that in the circumferential direction is closest to the primary position. To this end, the signals of the distance sensor in terms of control technology are processed so as to form travel drive control signals for the drive of the vehicle.

The control and evaluation unit by means of tool control signals is moreover configured for controlling the tightening procedure of the respective screw connection.

BRIEF DESCRIPTION OF THE DRAWINGS

Further details and advantages are derived from the following description of an exemplary embodiment illustrated in the drawing.

FIG. 1 shows a perspective illustration of two only partially shown, mutually interconnected annular portions of a tower of a wind power plant, having a travelling tool carrier, configured as a carriage, of a device for tightening screw connections.

FIG. 2 shows a sectional illustration of the two portions according to FIG. 1.

FIG. 3 shows a perspective illustration of a measuring wheel of the unit of a device for tightening screw connections according to FIG. 1.

FIG. 4 shows a view of a distance sensor of the unit of the device for tightening screw connections according to FIG. 1.

DESCRIPTION OF PREFERRED EMBODIMENTS

Two partially depicted portions 1a, 1b of a tower (not shown here) of a wind power plant are illustrated in FIGS. 1 and 2. The two portions 1a, 1b have a respective annular flange 2a, 2b which by way of a multiplicity of screw connections 10 which are situated at screw positions that are disposed so as to be distributed in a row and uniformly on the circumference along the annular flanges 2a, 2b to be tensioned in relation to one another. Each screw connection 10 is comprised of a threaded element 11 and a nut 12 screw-fitted thereon, wherein the nut 12 is supported in relation to the first annular flange 2a, and the threaded element 11 is supported in relation to the second annular flange 2b.

A tool carrier 3 of a device (not shown in more detail) for tightening screw connections is disposed so as to be displaceable along the ring 2 formed by the annular flanges 2a, 2b. A tool 4 having a hydraulically operated screw tensioning cylinder 6 for tightening the screw connection as well as a sensor, configured as a laser scanner 5, for measuring a gap size value are fastened to the tool carrier 3, wherein the tool carrier 3 is displaceable on a plurality of rollers 7 along an internal shell face of the first portion 1a as well as of the first annular flange 2a. The tool 4 and the laser scanner 5 are furthermore connected to a control and evaluation unit (not illustrated here), the functional mode of the control and evaluation unit being described in more detail hereunder.

The control and evaluation unit can be fastened to the tool carrier 3, for example, or disposed externally on a power supply unit, as well as connected to the corresponding components by way of a lead harness.

The tool carrier 3 for the vertical support thereof on the upper side of the first annular flange 2a is provided with rollers 7 which are supported on horizontal rotation axles on the tool carrier 3 and roll on the horizontal rotation axles. The object of the rollers 7 is to above all support the weight of the tool carrier 3 having the tool disposed thereon, wherein one of the rollers 7 is a driven roller 7.

The tool carrier 3 for the lateral support thereof in relation to the first portion 1a as well as in relation to the first annular flange 2a furthermore has additional rollers 7, the rotation axles thereof being disposed so as to be substantially parallel with the internal wall of the first portion 1a, or so as to be substantially vertical, respectively.

The tool carrier 3 for travelling along a ring 2 formed by the annular flanges 2a, 2b is provided with an electric travel drive (not shown in more detail here). The travel drive drives at least one of the rollers 7 of the tool carrier 3 such that the tool carrier 3 is set in motion along the internal shell face 8 of the annular flanges 2a, 2b.

The control and evaluation unit by way of travel drive control signals is configured for actuating the travel drive so as to move the tool carrier 3 up to a specific longitudinal position in which the tool 4 lies opposite the screw position of the respective screw connection to be tightened. The tightening of the respective screw connection 10 by way of tool control signals which are likewise issued by the control and evaluation unit is subsequently carried out by means of the screw tensioning cylinder 6.

The control and evaluation unit for moving to the respective longitudinal position of the screw connections to be tightened furthermore comprises a distance control module having a distance controller which is configured for stopping the travel drive upon reaching a predefined length of distance as the target variable.

According to a method according to the invention for tightening the screw connections 10, the tool carrier 3 is first moved along the entire length of the ring 2, thus across the entire circumferential length thereof, at least once. A plurality of longitudinal positions of the tool carrier 3 in relation to the annular flanges 2a, 2b are herein repeatedly detected as respective position values, wherein the size of the gap 15 present between the two annular flanges 2a, 2b at the respective current position is detected as the gap size value by means of the laser scanner 5.

The position value and the current gap size value detected at this position are transmitted to the control and evaluation unit which stores the individual gap size values conjointly with the respectively assigned position values as datasets. Furthermore, the control and evaluation unit from the gap size values contained in the datasets determines the largest gap size value or a gap size value of above-average size as a primary position. In other words, the primary position corresponds to the position on the circumference of the annular flanges 2a, 2b at which the gap 15 between the two annular flanges 2a, 2b is the largest or is of above-average size, wherein this gap 15 by means of tightening the respective screw connection 10 at this position is primarily closed or at least initially minimized. Consequently, the screw connection 10 that is subsequently tightened by the tool is that screw connection that is situated at the primary position or at a screw position that in a circumferential direction is directly ahead of or behind the primary position.

Once the screw connection 10 at the primary position has been tightened, these method steps can be repeated again once or multiple times. The steps can also be repeated until the gap 15 between the annular flanges 2a, 2b is substantially closed, wherein a plurality of primary positions which can be present at various positions of the annular flanges 2a, 2b are incrementally determined. A plurality of screw connections 10 are thus successively tightened until the gap 15 between the annular flanges 2a, 2b is substantially closed.

All of the screw connections 10 that to this point have not yet been tightened are subsequently tightened by the tool. All screw connections 10 which are provided for connecting the two portions 1a, 1b of the tower are thus ultimately tightened and/or retightened, and the gap 15 which could be present between the portions 1a, 1b and/or the annular flanges 2a, 2b for reasons of inaccuracies in terms of shape, production and orientation, for example, is closed.

The respective position value which corresponds to the longitudinal position of the tool carrier 3 relative to the annular flanges 2a, 2b is detected by means of a distance sensor 16 shown in FIG. 3. Consequently, a multiplicity of position values along the entire length of the ring are detected, the position values presently corresponding in each case to one screw position of the screw connection 10.

Alternatively, the position values can also be determined at locations between two screw connections 10. However, it is advantageous for each screw position of a screw connection 10 to be assigned a respective position value.

The distance sensor 16 disposed on the tool carrier 3 as per FIG. 3 comprises a measuring wheel 17 and an angular encoder 13 that detects the measuring wheel axle. Alternatively or additionally, the distance sensor 16 can also have a rotary encoder. The measuring wheel 17 is horizontally aligned and comes to bear on the internal shell face 8 of the first annular flange 2a, as can be seen in FIG. 4, and during the movement of the tool carrier 3 along the annular flanges 2a, 2b rolls on the internal shell face 8. The measuring wheel 17 is consequently supported in relation to the first annular flange 2a. Alternatively, the measuring wheel 17 can also be supported in relation to the second annular flange 2b, or roll on a horizontal contact face 14 of the respective annular flange 2a, 2b, the horizontal contact face 14 being illustrated in FIG. 2.

Furthermore alternatively, it is conceivable for the distance sensor 16 to comprise at least one of the rollers 7 of the tool carrier 3 and one rotary or angular encoder which detects the respective roller axle. In other words, the stand-alone measuring wheel 17 can be dispensed with in this case, wherein at least one of the rollers 7 of the tool carrier 3 which are supported in relation to the portions 1a, 1b or the annular flanges 2a, 2b and interact with a rotary or angular encoder is configured in such a manner that the longitudinal position of the tool carrier 3 in relation to the respective annular flange 2a, 2b is capable of being determined.

The laser scanner 5 as per FIG. 4 is directed perpendicularly onto the internal shell face 8 of the two annular flanges 2a, 2b, wherein the measuring beam 9 of the laser scanner 5 is aligned in the contact plane between the two annular flanges 2a, 2b. The laser scanner 5 is specified for scanning the surface of the annular flanges 2a, 2b as well as the gap 15 present therebetween, and for determining therefrom the gap size value for the height of the gap and for transmitting a corresponding signal to the control and evaluation unit.

LIST OF REFERENCE NUMBERS 1a, 1b Portion
2 Ring
2a, 2b Annular flange
3 Tool carrier
4 Tool
5 Laser scanner
6 Screw tensioning cylinder
7 Roller
8 Internal shell face
9 Measuring beam
10 Screw connection
11 Threaded element
12 Nut
13 Angular encoder
14 Contact face
15 Gap
16 Distance sensor
17 Measuring wheel

What is claimed is:

1. A method for tightening screw connections which are situated at screw positions that are disposed in a row along a ring comprised of a first annular flange and a second annular flange that are to be tensioned in relation to one another,
   wherein each screw connection is comprised of a threaded element and a nut screw-fitted thereon,
   wherein the nut is supported at the first annular flange and the threaded element is supported at the second annular flange,
   wherein a tool carrier configured to travel along the ring is provided,
   wherein the tool carrier comprises at least one tool configured to tighten the screw connection and further comprises a sensor,
   the method comprising:
   a) moving the tool carrier along an entire length of the ring at least once and detecting,
      while the tool carrier is moving along the entire length of the ring,
      repeatedly a respective current longitudinal position of the tool carrier in relation to the ring as a position value, and
      by the sensor,
      a size of a gap present between the first and second annular flanges at the respective current position as a gap size value,
   transmitting the thus detected position values and the associated gap size values to a control and evaluation unit, and
   storing the detected position values and the associated gap size values conjointly as datasets;
   b) the control and evaluation unit determining from the gap size values contained in the datasets a largest gap size value or a gap size value of above-average size along the entire length of the ring and selecting as a primary position the position value assigned to the determined largest gap size value or the gap size value of above average size;
   c) subsequently tightening with the tool the screw connection that is situated at the primary position or at the screw position that in a circumferential direction directly follows the primary position.

2. The method according to claim 1, further comprising repeating the steps a) to c) once or multiple times.

3. The method according to claim 2, further comprising, subsequent to the step of repeating, tightening with the tool all screw connections that have not yet been tightened.

4. The method according to claim 1, further comprising selecting a laser scanner as the sensor.

5. The method according to claim 4, further comprising aligning a measuring beam of the laser scanner in a contact plane between the first and second annular flanges.

6. The method according to claim 1, further comprising moving the tool carrier on a plurality of rollers along the ring.

7. The method according to claim 1, further comprising providing a distance sensor and detecting the position values by using the distance sensor.

8. The method according to claim 7,
further comprising moving the tool carrier on a plurality of rollers along the ring,
wherein the distance sensor comprises at least one roller and a rotary or angular encoder that detects a roller axle of the at least one roller,
wherein the at least one roller of the distance sensor is one of the plurality of the rollers for moving the tool carrier.

9. The method according to claim 7, wherein the distance sensor comprises a measuring wheel and a rotary or angular encoder that detects the measuring wheel axle.

10. The method according to claim 9, wherein the measuring wheel is supported at one of the first and second annular flanges.

11. The method according to claim 1, further comprising providing an electric travel drive and driving the tool carrier along the ring by the electric travel drive, wherein the control and evaluation unit provides travel drive control signals to move the tool carrier to a longitudinal position in which the tool lies opposite the screw position of the screw connection to be tightened and further provides tool control signals to tighten the screw connection with the tool.

12. The method according to claim 11, further comprising providing the control and evaluation unit with a distance control module having a distance controller configured to stop the electric travel drive upon reaching a predefined length of distance as a target variable when moving the tool carrier to the longitudinal position in which the tool lies opposite the screw position of the screw connection to be tightened.

* * * * *